United States Patent Office 3,495,843
Patented Feb. 17, 1970

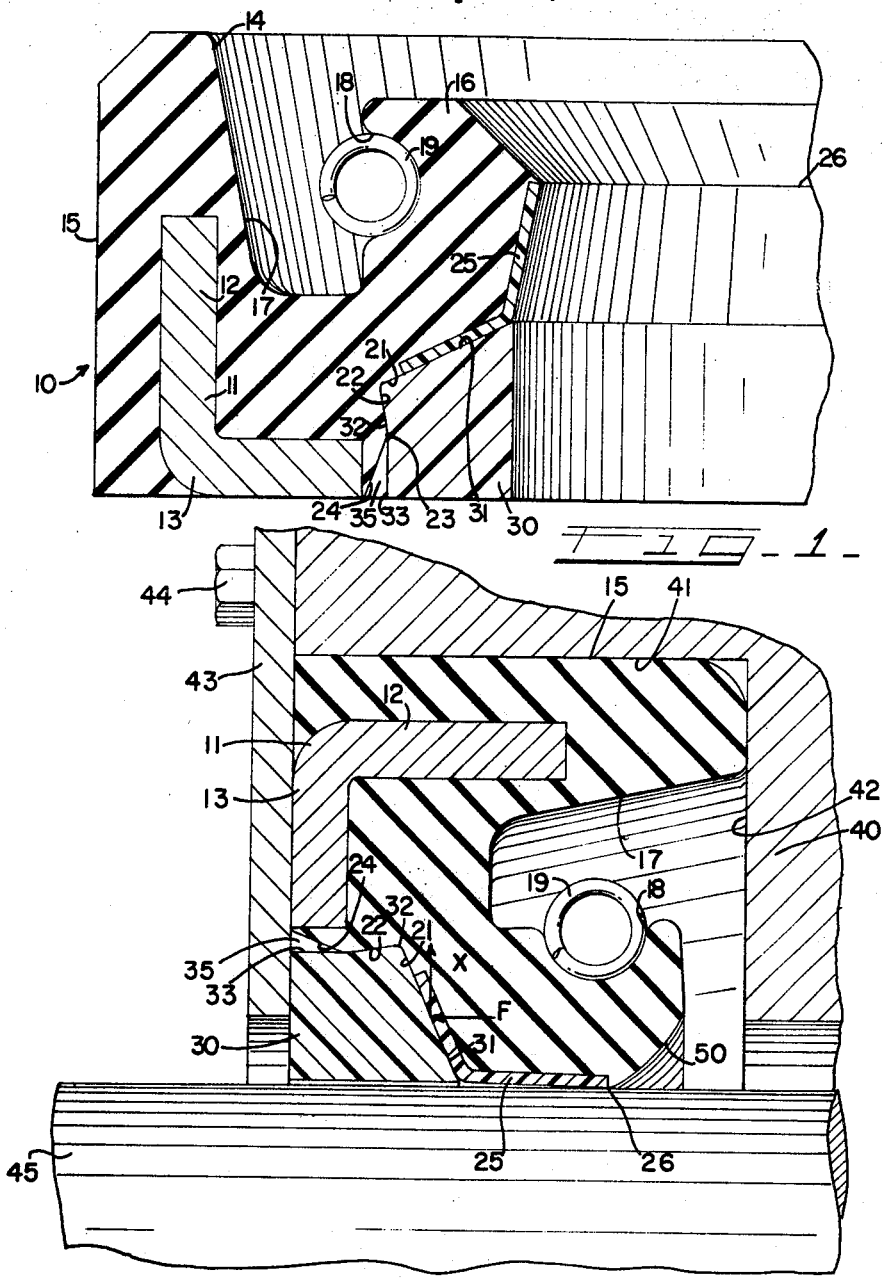

3,495,843
PRESSURE SEAL WITH ANTIEXTRUSION MEANS
Kare Andersen and Arnold P. Barth, Elgin, Bill J. Campbell, St. Charles, and Robert F. Fritch, Palatine, Ill., assignors to Chicago Rawhide Manufacturing Company, Chicago, Ill., a corporation of Illinois
Filed Apr. 17, 1967, Ser. No. 631,541
Int. Cl. F16j 15/32, 15/54
U.S. Cl. 277—183                                    9 Claims

ABSTRACT OF THE DISCLOSURE

High-pressure shaft seal with antiextrusion means to relieve sealing force generated by fluid pressure acting on the sealing lip, such antiextrusion means also serving to prevent extrusion of the sealing lip. Concentricity of the antiextrusion means is assured by the manner of mounting the same within the seal while being easily assembled.

---

The present invention relates to a new and improved shaft seal assembly, especially suited for use in high-pressure sealing installations. More specifically, the present invention relates to a shaft seal having a combination of elements, including an antiextrusion means which functions to prevent seal extrusion in high-pressure applications, and also serves to reduce application of stress to the sealing lip through a unique co-operative relation with a part of the sealing lip.

High-pressure conditions, such as are encountered in sealing power steering sector shafts and the like, generally result in rapid deterioration of existing seal designs when used in such an application. The conditions or environment typically encountered presents the following variables which, no doubt, contribute to the rapid deterioration of known types of seals in such applications. For example, shock loads of up to 1500 p.s.i. are experienced, while the shaft being sealed may be oscillating through 90° or more up to 30 times per minute. Combined with these severe conditions are the existence of some eccentricity of the shaft relative to the housing and the need for continuous and uniform operations from temperatures below 0° F. to in excess of 100° F.

In the past, known forms of seals have actually adhered to the shaft under the continuous application of high pressure and, on subsequent rotation of the shaft, separation between the rubber molecules occurs as the seal attempts to move with the shaft. Axial cracks are formed in the seal lip as a result. Combined with this undesirable condition was the problem of accommodating shaft eccentricity while resisting extrusion of the sealing lip between the shaft and the usual back-up devices. Further complications are presented because the rubber compound of the sealing lip must be flexible over the wide range of temperature set forth above if performance is to be acceptable. In short, known forms of shaft seals in an acceptable price range were inadequate to meet this type of sealing requirement, especially over a prolonged period. Adherence of the seal to the shaft was thought to be attributable, at least in part, to the excessive sealing force experienced at the seal interface, as this varied with variances in the pressure sealed against.

The present invention relates to a new and improved shaft seal having an axially and radially opening groove into which is interfitted a novel antiextrusion insert or element, both of which contribute to the good sealing performance in an environment having the variable conditions set forth above. By definition, the antiextrusion insert serves to prevent extrusion of the sealing lip which, of course, is essential when the seal is subjected to high-pressure shock loads of the order noted above. As a consequence, the elastomer of which the sealing lip is formed may be selected from known types which remain flexible over the temperature range indicated. Secondly, the antiextrusion insert is provided with a back-up surface which is tapered in a direction away from the fluid pressure and sealing lip to serve as a stress relieving means which is responsive to increases in fluid pressure to provide an increase stress relieving component and, thus, reduce the total sealing force on the lip. In order to enhance the stress relieving function and also assist in preventing adherence of the seal to the shaft, a sealing insert formed of plastic material such as Teflon covers the sealing lip and is disposed in sliding engagement with the back-up surface on the antiextrusion insert. This keeps frictional resistance to relative movement between the sealing lip and antiextrusion insert at a minimum.

Eccentricity of the shaft relative to the housing is accommodated by the flexing of the sealing lip. This eccentricity is also accommodated by the antiextrusion insert because of the unique manner in which it is mounted. Within the sealing member is provided a relief groove adjacent the periphery of the antiextrusion insert which permits it to accommodate eccentric shaft movement without undue distortion.

The foregoing statements of the present invention set forth features, objects and purposes, with the principal object of the invention being to provide a high-pressure shaft seal which incorporates a novelly shaped antiextrusion insert which provides an improved structural and co-operative operational characteristic.

A further object of this invention is to provide a high-pressure shaft seal having a sealing lip formed of a relatively flexible material with a low coefficient of friction plastic sealing insert bonded thereto which co-operates with a novelly shaped antiextrusion insert to provide stress relieving in response to increases in fluid pressure applied to the sealing lip.

A still further object of this invention is to provide an antiextrusion element which may be easily assembled to a shaft seal and including means permitting it to accommodate movement eccentric to the axis of the shaft seal.

Other objects and purposes not specifically set forth will become apparent from the following detailed description made in conjunction with the drawings wherein:

FIGURE 1 is a fragmentary longitudinal-sectional view of the high-pressure seal of the present invention; and FIGURE 2 is a fragmentary half-sectional view of the seal of FIGURE 1 in its operative installation.

The high-pressure seal 10 of FIGURE 1 includes a shell-like retainer 11 of annular shape and having an axially extending portion 12 and a radially extending portion 13. Bonded to the shell-like retainer 11 is a sealing member 14 having an outer bore engageable circumferential surface 15 at one periphery and a sealing lip portion 16 at the other periphery. The sealing lip portion 16 is formed by an axially opening groove 17 formed in the sealing member 14 and shaped in the region of the sealing lip portion 16 to form a spring retaining groove 18 into which is fitted a continuous coil spring 19.

The axially extending portion 12 of the shell-like retainer 11 may terminate short of the inner part of the sealing member 14 or may be of substantially identical length. Radially inwardly of the shell-like retainer is formed an axially and radially opening groove 20 which has one side formed by a wall portion 21 on the sealing lip portion 16. A frusto-conical surface 22 is of increased diameter adjacent the sealing lip and terminates at a point 23 formed by the intersection with an inwardly tapering frusto-conical wall portion 24.

The sealing lip portion 16 may be provided with a sealing insert 25 formed of a thin sheet of material having a low coefficient of friction such as Teflon. The sheet forming the sealing insert 25 is bonded directly to the sealing lip and extends from the actual line of shaft contact at 26 substantially continuous along the frusto-conical wall portion 21 forming one side of the grove 20. Any low co-efficient of friction material may be used which may be readily bonded to a lip configuration and which will provide adequate flexibility to accommodate eccentric shaft movement and expected lip distortion due to high sealing pressures. The material must also be compatible with the material used in the antiextrusion insert to be described.

The groove 20 receives an antiextrusion insert 30 formed with a back-up surface 31 which tapers away from the sealing lip and direction of pressure. This surface may be of substantially complementary configuration to the wall portion 21 along its entire length, which wall portion is formed in part by the sealing insert. The inner diameter of the antiextrusion insert is chosen so as to closely ride the shaft of intended use while the outer periphery of the antiextrusion insert 30 is provided with a tapering surface 32 which is of complementary configuration to the frusto-conical surface 22 forming the top part of the groove. This serves to permit the antiextrusion insert 30 to be snapped into the groove 20 at assembly where it will be retained throughout shipment, installation and use. A cylindrical wall portion 33 on the insert 30 merges with the frusto-conical surface 32 at the point of intersection of the frusto-conical surfaces 24 and 22 on the sealing member. The cylindrical wall 33 and frusto-conical surface 24 co-operate to form an annular axially opening relief groove 35.

In FIGURE 2 is illustrated one form of an operative installation of the shaft seal of the present invention which includes a housing 40 having a counterbore forming a circumferential cylindrical wall 41 and radially extending wall 42 against which the inner end of the sealing member 14 is abutted. The circumferential wall 15 of the sealing member is in fluid-tight engagement with the cylindrical wall 41 to prevent fluid leakage along the outer periphery of the sealing member 14. The seal may be held in the counterbore by any suitable means such as a back-up plate 43 which is of annular form and may be joined to the housing 40 to a plurality of cap screws 44 or the equivalent.

A movable shaft 45 is positioned within the housing 40 in coaxial relationship to the wall 41 and may rotate, reciprocate or any combination of the two. In the high-pressure sealing application alluded to previously, the shaft oscillates through an angle of about 90° with a frequency of about 30 oscillations per minute. The outer surface of the shaft is machined to a satisfactory finish to provide good sealing results and the sealing lip portion 16 is positioned around the shaft in constrictive sealing engagement with the natural resiliency of the elastomer and the coil spring, providing the sealing force to bring the lip into constrictive sealing engagement with the shaft. As will be seen, the fluid pressure sealed against supplements and increases this force. The sealing insert 25 is disposed at the point of contact beneath the coil spring and is held in engagement with the outer circumference of the shaft and extends along the side of the groove 20.

The inner diameter of the antiextrusion insert 30 may have a suitable clearance so that it will closely ride the shaft 45. Eccentricity in the shaft 45 is accommodated by movement of the insert 30 relative to the sealing member 14. The novel relief groove 35 permits the antiextrusion insert 30 to distort the frusto-conical wall 22, with the groove 30 providing a space into which the rubber may extrude as the insert moves and responds to eccentricity.

When the pressure of the fluid sealed against in the groove 17 is greater than the pressure outside the housing, constrictive force, which supplements or adds to the spring force, causes the sealing lip 16 to more tightly engage the shaft. As this force acts normal to the surfaces of the sealing member 14, the force is transmitted through the sealing lip 16 to the antiextrusion insert, as represented by the force vector F in FIGURE 2. Because the surface 31 is inclined or frusto-conical, a reactive force component represented by the vertical vector X results, operating in a direction which tends to pull the sealing lip 16 radially outward in opposition to the combined forces generated by the spring 19, the resiliency of the lip 16, and the fluid pressure acting over the sealing lip portion 16. Obviously, any increases in the magnitude of the force F will be reflected in an increase in the magnitude of the vector X. The reactive force X generated by the tapered surface 21 engaging the back-up surface 31 causes a reduction in the sealing force while the force opposite and equal to X serves to hold the sealing insert more tightly about the shaft 45 and, thus, as pressure is increased within the housing both forces will be increased. Some force relief is provided by the taper of the lip at 50 on the pressure side.

From the foregoing description, it can be appreciated that two basic functions are served by the antiextrusion insert. It provides a reactive force which causes reduction in the lip sealing pressure due to pressure differential across the seal. More accurately termed, this force relief may be called "stress relieving" when referring to the seal as a unit. In addition, the antiextrusion insert provides a back-up which maintains the sealing lip portion 16 in operative sealing relation and prevent extrusion under high-pressure applications. Eccentricity of the shaft is accommodated by the antiextrusion insert being mounted with a portion engaged with the sealing element and a relief groove provided adjacent the outer periphery. The relieved portion adjacent the outer periphery of the antiextrusion element serves to permit distortion of the sealing member 14 on movement of the antiextrusion insert 30 within the mounting groove in the sealing member.

The high-pressure seal of the present invention may be formed by conventional molding and bonding techniques. In a preferred embodiment, the antiextrusion insert was formed of nylon synthetic plastic material such as Zytel (Du Pont Company) brand nylon, or other material, which is more rigid than the sealing insert formed of Teflon. The shell retainer was a conventional metal stamping, while the elastomer was a low acrylonitrile compound having good low temperature characteristics. While these are preferred materials, it is obvious that equivalent materials may be used with the expectation of similar functional results. For example, any semi-rigid material may be used in the antiextrusion insert 30 which will be semi-rigid, yet capable of constricting to tightly fit the shaft in response to pressure applied either around the circumferential wall 32, along the tapered wall 31, or a combination of both. It is to be appreciated that such constricting will occur as the sealing member 10 is deformed by the fluid pressure. Even while tightly fitting the shaft, the antiextrusion insert is free to accommodate shaft eccentricity due to the presence of the relief groove 35. Obviously, the principles of this invention may be applied to piston rings as well as shaft seals, as one is merely a reverse application of the other.

Upon a consideration of the foregoing, it will become obvious to those skilled in the art that various modifications may be made without departing from the invention embodied herein. Therefore, only such limitations should be imposed as are indicated by the spirit and scope of the appended claims.

We claim:

1. A shaft seal particularly adapted for use in high-pressure sealing applications, said shaft seal comprising a shell-like retainer, a sealing member joined to said retainer and having a radially directed sealing lip, a sealing insert overlying a part of said sealing lip and having a part thereof adapted to for contact with a shaft surface to be sealed, an annular groove formed in said sealing member and having a frusto-conical wall portion, said sealing insert extending into said annular groove along said frusto-conical wall portion and an annular antiextrusion insert fitted in said annular groove and having a part thereof engaging said sealing insert along said frusto-conical wall portion, said antiextrusion insert having a radial part thereof which is deformable by pressure within said seal into a closely overlying fit with said shaft to prevent extrusion of said sealing member along said shaft, said seal also including means for supporting said antiextrusion insert for radial movement within said shaft seal to accommodate rotational eccentricity in said shaft.

2. A shaft seal as defined in claim 1 in which said means for supporting said antiextrusion insert include a portion of said sealing member extending between a portion of said retainer and one portion of said antiextrusion insert, and a circumferentially extending groove within a part of said sealing member, said groove being disposed radially outwardly of another portion of said antiextrusion insert.

3. The shaft seal of claim 2 wherein said antiextrusion insert is held within said sealing member by a snap-in fit.

4. A sealing arrangement comprising an annular housing member, an annular member disposed in coaxial spaced relation within said housing and movable relative thereto, sealing means interposed between said members, said sealing means comprising a sealing member having a circumrerential surface tightly engaged by one of said members, a sealing lip engaging the other of said members, said sealing lip including a sealing insert extending along a frusto-conical wall portion of said sealing means and forming a side wall of a groove in said sealing member, an antiextrusion insert received in said groove and having a frusto-conical side wall engaging said sealing insert to provide a force component urging said sealing insert into closely overlying relation to said other member when said sealing lip is exposed to fluid pressure to prevent extrusion of said seal lip between said other member and a portion of said antiextrusion insert, said sealing insert being comprised of a material having a lower coefficient of friction than the material comprising said sealing member.

5. The sealing arrangement of claim 4 wherein a peripheral portion of said antiextrusion element is disposed in spaced relation to a portion of said sealing member to form a relief groove and permit movement of said antiextrusion element relative to said sealing member to accommodate rotational eccentricity in the other of said members.

6. A shaft seal as defined in claim 1 in which said sealing insert comprises a lubricous fluorocarbon material which is stiffer than the material comprising said sealing member, and in which said sealing member is an elastomeric material.

7. A shaft seal as defined in claim 1 in which said antiextrusion means is a plastic material which is stiffer than the material comprising the sealing member and also stiffer than the material comprising the sealing insert.

8. A shaft seal as defined in claim 1 in which said sealing insert comprises a lubricous fluorocarbon polymeric material bonded to said sealing member, and wherein said sealing insert engages, on one portion of its inner surface, said shaft, and on another portion of its inner surface, a portion of said antiextrusion insert.

9. A sealing arrangement as defined in claim 4 which further incudes a rigid backup member for retaining said seal assembly in place within said housing member, said backup member having an axially inwardly directed face portion for engaging and supporting said sealing means and a portion of said antiextrusion means, said backup member having an opening therein for receiving said shaft, said opening being of smaller diameter than the outer diameter of said antiextrusion means and of larger diameter than the inner diameter of said antiextrusion means.

References Cited

UNITED STATES PATENTS

| 2,914,369 | 11/1959 | Hayman. | |
| 2,804,324 | 8/1957 | Stallings | 277—153 |
| 2,804,325 | 8/1957 | Riesing | 277—182 X |
| 3,071,386 | 1/1963 | Scannell | 277—177 |
| 3,254,898 | 6/1966 | Herbenar et al. | 277—176 X |

FOREIGN PATENTS 1,375,534   9/1964   France.

SAMUEL ROTHBERG, Primary Examiner

U.S. Cl. X.R.

277—153, 176, 188